Patented Apr. 15, 1952

2,593,114

UNITED STATES PATENT OFFICE 2,593,114

PREPARATION OF AROMATIC MERCURY HALIDES

Otto Daněk and Jaroslav Nosek, Pardubice-Rybitvi, Czechoslovakia, assignors to Vychodoceske Chemicke Zavody, narodni podnik, Pardubice, Czechoslovakia No Drawing. Application March 9, 1951, Serial No. 214,852. In Czechoslovakia February 19, 1947

16 Claims. (Cl. 260—433)

The present invention relates to the manufacture of aromatic mercury halides having the general formula: RHgY, wherein R represents an aryl or a substituted aryl group, and Y represents a halide radical.

The present application is a continuation-in-part of our co-pending application filed October 1, 1942, having the Serial No. 777,364, now abandoned.

A prior art method for the manufacture of phenyl mercury chloride has been described by Nesmajanov in Berichte 62, 1015, wherein a solution of benzene diazonium chloride (diazotized aniline) is introduced with a solution of mercury chloride into dilute hydrochloric acid whereby a double salt is formed which is filtered with suction. This double salt is then introduced into acetone and decomposed by means of two equivalents of powdered copper (two gram-atoms copper to 1 gram-molecule of double compound), and the phenyl mercury chloride formed is extracted with acetone to separate it from the insoluble cuprous chloride also formed during the reaction. The yield obtained by Nesmajanov's process is 51% of the theoretical yield. The reaction proceeds in accordance with the following equations wherein R represents an aryl group.

1. $RN_2Cl + HgCl_2 \rightarrow RN_2Cl.HgCl_2$
2. $RN_2Cl.HgCl_2 + 2Cu \rightarrow RHgCl + Cu_2Cl_2 + N_2$

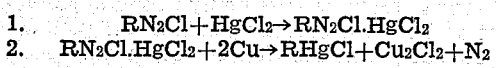

Such prior art methods of producing aromatic mercury halides obviously involve great expense in the use of costly organic solvents and large amounts of copper. Another disadvantage of the prior art methods is the necessity of separating the intermediate product, namely the double salt, from the reaction mixture prior to proceeding with the decomposition step which produces the aryl mercury halide.

Applicants have simplified this involved, time consuming and costly procedure by the use of a continuous and uninterrupted method of producing said aryl mercury halides. Another improvement of the instant invention over the prior art methods is the considerably increased yield obtained hereby. The sum total of the above mentioned and other advantages results in a superior commercial process particularly suitable for mass production of the aryl mercury halides which are useful in the elimination of fungi and molds and as seed immunizing agents. Furthermore, the resultant products of this invention exhibit a particularly low solubility in water rendering them considerably more economical in use, said products maintaining their therapeutic activity over a longer period of time.

Accordingly, an object of the present invention is the development of a new process for the production of a high yield of aryl mercury halides.

Another object of this invention is the development of a superior commercial process of manufacturing aryl mercury halides.

A further object of this invention is the development of a continuous and uninterrupted method of producing aryl or substituted aryl mercury halides.

A further object of this invention is the development of a simplified process of producing aryl mercury halides.

Further objects and advantages of the present invention will be apparent from the following description.

It has now been discovered that aromatic mercury halides may be prepared in a continuous manner by diazotizing an aromatic amine at a temperature of about 0–5° C. to form the diazonium salt, introducing said diazonium salt into an acidic aqueous medium containing a mercury halide and an equivalent amount of cuprous halide, whereby a diazonium double salt with mercury halide is formed which is immediately decomposed by said cuprous halide to an aromatic mercury halide according to the reaction:

$RN_2Y.HgY_2 + Cu_2Y_2 \rightarrow RHgY + 2CuY_2 + N_2$

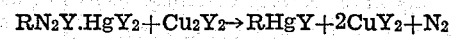

wherein R represents an aromatic group and Y represents a halide, and recovering a substantially pure aromatic mercury halide.

It has also been discovered, and constitutes an underlying principle of the present invention, that instead of powdered copper it is possible to use a cuprous halide for the decomposition of the diazonium double salt. It has been further found that this decomposition reaction is an ionic one requiring only two electro-positive valences for the decomposition of the double salt, i. e., 1 gram-molecule of cuprous halide to 1 gram-molecule of the double salt. The resulting product, aryl mercury halide, shows a higher degree of purity and better quality than if powdered copper is used as the reducing agent.

It has also been discovered that the decomposition reaction is an ionic reaction and can be carried out in an aqueous medium or in the presence of organic water miscible solvents or mixtures of water and organic water miscible solvents. Furthermore, only two electro-positive valences are necessary for the decomposition of the diazonium double salt. Consequently, one molecule of double salt requires one molecule of a cuprous halide which results in an 80% yield of the aromatic mercury halide. The decomposition reaction proceeds generally in accordance with the following formula:

3. $XRN_2Y \cdot HgY_2 + Cu_2Y_2 \rightarrow XRHgY + 2CuY_2 + N_2$ wherein X denotes any substituent from the group consisting of H, $CH_3$, $C_2H_5$, OH, $OCH_3$, $OC_2H_5$, Cl, Br, I, F, $NO_2$, COOH; R denotes an aryl group, and Y denotes one of the halogens Cl, Br, I.

Thus, an essential feature of the instant invention resides in the utilization of only one equivalent of cuprous halide, the total amount of copper being transformed into the water soluble cupric halide during the decomposition reaction, as clearly illustrated by the above chemical reaction. This eliminates the prior art step of separating the insoluble cuprous chloride from the insoluble aryl mercury halide, thus simultaneously effecting a saving of organic solvent, since acetone is used in the above separation step.

Another important feature of the present process is the use of an aqueous medium for the decomposition reaction. This eliminates the use of expensive solvents heretofore utilized. Organic solvents miscible with water, such as acetone, methanol, ethanol and the like, may be added to the aqueous medium if a product of a higher degree of purity is desired. A mixture of water and organic water miscible solvent may be advantageously used if a chemically pure product is desired. A small quantity of certain impurities which normally would be precipitated with the resultant product in an aqueous medium is eliminated from said product in an aqueous organic medium due to the solubility of said impurities in a mixture of water and organic solvent.

Another feature of the instant process is the use of an acidic medium for the decomposition of the double diazonium salt. A neutral medium may also be utilized but it has been found that in an acidic medium such as hydrochloric acid the reaction proceeds in a more favorable manner.

A further essential feature of the present process is the maintenance of temperatures of about 5–10° C. during the decomposition reaction such as by the addition of ice to the reaction mixture.

The diazotizing reaction also occurs at temperatures of about 0–5° C. by simultaneously cooling the reaction mixture during the formation of the diazonium compound ($RN_2Cl$). The diazonium compound is prepared by the known method of diazotizing an aromatic amine with sodium nitrite or the like in the presence of hydrochloric acid or its equivalent.

A particular embodiment of this invention is the production of the diazonium double salt with mercury halide by adding the diazonium salt to a suspension containing mercury halide and cuprous chloride, said formed double salt being immediately reduced to the aromatic mercury halide by the cuprous chloride present in the said suspension. The reaction medium utilized for the formation of the double salt and its almost immediate reduction to the aromatic mercury halide is preferably an acidified aqueous medium. The aqueous medium may also contain water-miscible organic solvents, if an unusually pure product is desired. Thus, it is apparent that the formation of the double salt and its decomposition to the aromatic mercury halide is carried out in the same medium, without the separation of any intermediate products.

The aryl-mercury bromide or iodide can be prepared by the same procedure as the chloride as represented by Equation No. 3. However, it is not necessary to employ an exclusively bromide or iodide medium. The decomposition of the double diazonium mercury chloride salt may be carried out in a chloride medium such as hydrochloric acid, in the presence of only one equivalent of a different soluble metallic halide such as the alkali metal bromide or iodide. The bromide and iodide ions are more reactive than the chloride ions and consequently replace the chloride to form the corresponding aryl-mercury bromide or iodide, which results in a more insoluble halide of an aromatic mercury compound. The reaction proceeds in accordance with the following formula, wherein Y represents Br or I, and Me represents Na or K:

4. $XRN_2Cl \cdot HgCl_2 + Cu_2Cl_2 + MeY \rightarrow XRGgY + 2CuCl_2 + MeCl + N_2$ Among the substantial advantages of the present invention is that a substantially very pure product is obtained and that the entire course of reaction takes place in a single phase without the intervening isolation of any of the intermediate products. Only the resultant crystalline product, aryl mercury halide, is isolated, by suction after the entire cuprous halide employed for the decomposition reaction has been dissolved and transformed into the soluble cupric halide.

This new process for the preparation of aryl mercury halides and similar compounds according to the present invention represents a considerable technical advance as compared with the processes heretofore known and may be used as a preferred commercial process for mass production. The advantages of the process according to the invention over the prior art processes are simplification of the entire course of the reaction, which is carried out continuously in a single vessel without separation of the intermediate products, the expensive organic solvents for the extraction of the product are either not necessary at all or are used only in small quantities if desired, the product exhibits a higher degree of purity and the yield is very good.

The following examples are additionally illustrative of the present invention and are not to be considered as limiting the scope thereof.

Example I 100 litres of hydrochloric acid of a sp. gr. of 1.17 are cooled by means of 300 kgs. of ice broken into pieces the size of a fist, to which 46.5 kgs. of aniline are added. Diazotization is carried out in the customary way by means of 35.0 kgs. of sodium nitrite at a temperature not exceeding 5° C. The above solution of benzene diazonium chloride is gradually introduced into a suspension which contains 100 litres of hydrochloric acid of a sp. gr. of 1.17, 136 kgs. of mercuric chloride and 99 kgs. of cuprous chloride, $Cu_2Cl_2$. This suspension is also being cooled by the introduction of 200 kgs. of ice broken into small pieces. A crystalline paste of a double salt of benzene diazonium chloride with mercuric chloride is immediately produced, said paste being decomposed by the cuprous chloride present and reduced to phenyl mercury chloride. The temperature during this reaction is maintained within the limits of 5–10° C. The decomposition of the double salt is terminated within one hour and the precipitated insoluble phenyl mercury chloride, C₆H₅HgCl, is removed by suction, washed with water and dried. The yield of the technically pure product amounts to 120 kgs., which is 76.7% of the theoretical yield. The melting point of the phenyl mercury chloride is 251° C. The entire copper is in the form of soluble cupric chloride CuCl₂, which remains dissolved in the mother liquor.

*Example II*

46.5 kgs. aniline and 65 kgs. of crystalline sodium bromide are introduced into 100 litres of hydrochloric acid of a sp. gr. of 1.17 and the solution is cooled by the addition of 300 kgs. of broken ice. The solution is then diazotized in the usual manner with 35.0 kgs. of sodium nitrite at a temperature not exceeding 5° C. The produced solution of benzene diazonium chloride is slowly introduced into a suspension, which contains 100 litres of hydrochloric acid of a sp. gr. of 1.17, 136 kgs. of mercuric chloride and 99 kgs. of cuprous chloride, Cu₂Cl₂, and the suspension is further cooled by gradually introducing 200 kgs. of broken ice. A crystalline paste of the double salt of benzene diazonium chloride with mercuric chloride is immediately formed, said paste being decomposed by the cuprous chloride present and transformed into phenyl mercury bromide. The temperature during this reaction is maintained at 5° C. The decomposition of the double salt is terminated within about 1 hour and the precipitated insoluble raw phenyl mercury bromide, C₆H₅HgBr, is removed by suction, washed with water and dried. The yield of the technically pure product amounts of 141 kgs. or 80% of the theoretical yield. The entire copper is dissolved in the mother liquor in the form of soluble cupric chloride.

*Example III*

53.5 kgs. of p-toluidine are introduced into 160 litres of hydrobromic acid of a sp. gr. of 1.377 and the solution is cooled by the addition of 300 kgs. of broken ice. The produced hydrobromide of p-toluidine is diazotized in the usual way by means of 35.0 kgs. of sodium nitrite. The solution of p-methyl benzene diazonium bromide thus produced is gradually introduced into a solution of 180 kgs. of mercury bromide in 100 litres of hydrobromic acid of a sp. gr. of 1.377, cooled with 200 kgs. of ice, wherein 144 kgs. of cuprous bromide are suspended. A double salt of p-methyl benzene diazonium bromide with mercury bromide is first formed which salt is immediately decomposed by the cuprous bromide present and reduced to p-tolyl mercury bromide, CH₃C₆H₄HgBr The total amount of copper dissolves in the mother liquor in the form of cupric bromide, CuBr₂. The temperature during this decomposition operation is maintained between 5-10° C. The yield of technically pure p-tolyl mercury bromide amounts to 130 kgs. or 70% of the theoretical yield. The melting point of the product is 233-234° C.

*Example IV*

69.5 kgs. of p-nitroaniline are introduced into 110 litres of hydrochloric acid of sp. gr. 1.17, cooled with 200 kgs. of ice and diazotized in the usual manner at a temperature not exceeding 5° C. with 35.0 kg. of sodium nitrite. The solution of p-nitrobenzene diazonium chloride formed is gradually added to a solution containing 100 litres of hydrochloric acid of sp. gr. 1.17, 800 litres of ethanol, 136 kgs. of mercury chloride, in which are suspended 99.0 kgs. of cuprous chloride, Cu₂Cl₂

The double salt, p-nitro-benzene-diazonium chloride with mercury chloride, produced at first is immediately decomposed by the cuprous chloride present and reduced with a simultaneous release of nitrogen to form p-nitro-phenyl mercury chloride NO₂C₆H₄HgCl. The total amount of copper dissolves in the mother liquor in the form of cupric chloride, CuCl₂. The temperature during this decomposition reaction is maintained within the range of 0-5° C. The precipitated technically pure product is removed by suction, washed with water and dried. The yield amounts to 77.0 kgs. or 43% of the theoretical yield. The melting point of the product is 263-264° C.

It will be understood that each of the elements described above, or two or more together, may also find a useful application in other types of method of manufacturing halide differing from the types described above.

While we have illustrated and described the invention as embodied in methods of manufacturing aromatic mercury halides, we do not intend to be limited to the details shown, since various modifications and structural changes may be made without departing in any way from the spirit of our invention.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What we claim as new and desire to secure by Letters Patent is:

1. A commercial method of manufacturing an aromatic mercury halide which comprises diazotizing an aryl amine at a temperature of about 0-5° C. to form the diazonium salt, introducing said diazonium salt into an acidic aqueous medium containing a mercury halide and an equivalent amount of cuprous halide, whereby a diazonium double salt with mercury halide is formed which is immediately decomposed by said cuprous halide to an aryl mercury halide according to the reaction:

$$RN_2Y.HgY_2 + Cu_2Y_2 \rightarrow RHgY + 2CuY_2 + N_2$$

wherein R represents an aryl group and Y represents a halide, and recovering a substantially pure aryl mercury halide.

2. A commercial method of manufacturing an aromatic mercury halide which comprises diazotizing an aromatic amine at a temperature of about 0-5° C. to form the diazonium salt, introducing said diazonium salt into an acidic aqueous medium containing a mercury halide and an equivalent amount of cuprous halide, whereby a diazonium double salt with mercury halide is formed which is immediately decomposed by said cuprous halide to an aromatic mercury halide according to the reaction:

$$RN_2Y.HgY_2 + Cu_2Y_2 \rightarrow RHgY + 2CuY_2 + N_2$$

wherein R represents an aromatic group and Y represents a halide, and recovering a substantially pure aromatic mercury halide.

3. A commercial method of manufacturing an aromatic mercury halide which comprises diazotizing a substituted aryl amine, said substituent being selected from the group consisting of $CH_3$, $C_2H_5$, $OH$, $OCH_3$, $OC_2H_5$, $Cl$, $Br$, $I$, $F$, $NO_2$, and $COOH$, at a temperature of about 0–5° C., to form the diazonium salt, introducing said diazonium salt into an acidic aqueous medium containing a mercury halide and an equivalent amount of cuprous halide, whereby a diazonium double salt with mercury halide is formed which is immediately decomposed by said cuprous halide to a substituted aryl mercury halide according to the reaction:

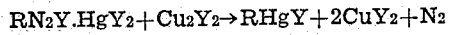

wherein R represents a substituted aryl group and Y represents a halide, and recovery a substantially pure substituted aryl mercury halide.

4. A commercial method of manufacturing an aromatic mercury halide which comprises diazotizing an aromatic amine at a temperature of about 0–5° C. to form the diazonium salt, introducing said diazonium salt into an acidic aqueous medium admixed with a water-miscible organic solvent containing a mercury halide and an equivalent amount of cuporus halide, whereby a diazonium double salt with mercury halide is formed which is immediately decomposed by said cuprous halide to an aromatic mercury halide according to the reaction:

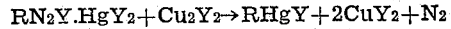

wherein R represents an aromatic group and Y represents a halide, and recovering a substantially pure aromatic mercury halide.

5. A commercial method of manufacturing an aromatic mercury halide which comprises diazotizing an aryl amine at a temperature of about 0–5° C. to form the diazonium salt, reacting said salt with a mercury halide to form a diazonium double salt containing mercury halide, decomposing said double salt at a temperature of about 5–10° C. in an acidic aqueous medium by the addition of an equivalent weight of cuprous chloride to form an insoluble aryl mercury halide according to the reaction:

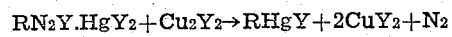

wherein R represents an aryl group and Y represents a halide and recovering a substantially pure aryl mercury halide.

6. A commercial method of manufacturing an aromatic mercury halide which comprises diazotizing an aromatic amine at a temperature of about 0–5° C. to form the diazonium salt, reacting said salt with a mercury halide to form a diazonium double salt containing mercury halide, decomposing said double salt at a temperature of about 5–10° C. in an acidic aqueous medium by the addition of an equivalent weight of cuprous chloride to form an insoluble aromatic mercury halide according to the reaction:

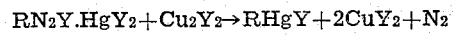

wherein R represents an aromatic group and Y represents a halide, and recovering a substantially pure aromatic mercury halide.

7. A commercial method of manufacturing an aromatic mercury halide which comprises diazotizing a substituted aryl amine at a temperature of about 0–5° C. to form the diazonium salt, reacting said salt with a mercury halide to form a diazonium double salt containing mercury halide, decomposing said double salt at a temperature of about 5–10° C. in an acidic aqueous medium by the addition of an equivalent weight of cuprous chloride to form an insoluble substituted aryl mercury halide according to the reaction:

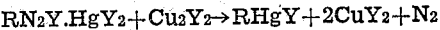

wherein R represents a substituted aryl group and Y represents a halide, and recovering a substantially pure substituted aryl mercury halide.

8. A commercial method of manufacturing an aromatic mercury halide which comprises diazotizing an aryl amine at a temperature of about 0–5° C. to form the diazonium salt, reacting said salt with a mercury halide to form a diazonium double salt containing mercury halide, decomposing said double salt at a temperature of about 5–10° C. in an acidic aqueous medium containing a water-miscible organic solvent by the addition of an equivalent weight of cuprous chloride to form an insoluble aryl mercury halide according to the reaction:

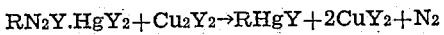

wherein R represents an aryl group and Y represents a halide, and recovering a substantially pure aryl mercury halide.

9. A commercial method of manufacturing an aromatic mercury halide which comprises diazotizing an aryl amine at a temperature of about 0–5° C. to form the diazonium salt, reacting said salt with a mercury halide to form a diazonium double salt containing mercury halide, decomposing said double salt in the presence of one equivalent of a soluble halide salt, said halide being different from the halide in the double salt, at a temperature of about 5–10° C. in an acidic aqueous medium by the addition of an equivalent weight of cuprous chloride to form an insoluble aryl mercury halide and recovering a substantially pure aryl mercury halide.

10. A commercial method of manufacturing an aromatic mercury halide which comprises diazotizing an aryl amine at a temperature of about 0–5° C. to form the diazonium salt, reacting said salt with a mercury chloride to form a diazonium double salt containing mercury chloride, decomposing said double salt, in the presence of an equivalent amount of a soluble halide salt selected from the class consisting of NaBr, NaI, KBr and KI, at a temperature of about 5–10° C. in an acidic aqueous medium by the addition of an equivalent weight of cuprous chloride to form an insoluble aryl mercury halide and recovering a substantially pure aryl mercury halide.

11. A commercial method of manufacturing an aromatic mercury halide which comprises diazotizing an aromatic amine at a temperature of about 0–5° C. to form the diazonium salt, reacting said salt with a mercury halide to form a diazonium double salt containing mercury halide, decomposing said double salt in the presence of an equivalent amount of a soluble halide salt selected from the class consisting of NaBr, NaI, KBr and KI, at a temperature of about 5–10° C. in an acidic aqueous medium by the addition of an equivalent weight of cuprous chloride to form an insoluble aromatic mercury halide, and recovering a substantially pure aromatic mercury halide.

12. A commercial method of manufacturing an aromatic mercury halide which comprises diazotizing a substituted aryl amine at a temperature of about 0–5° C. to form the diazonium salt, reacting said salt with a mercury halide to form a diazonium double salt containing mercury halide, decomposing said double salt in the presence of an equivalent amount of a soluble halide salt selected from the class consisting of NaBr, NaI, KBr and KI, at a temperature of about 5–10° C. in an acidic aqueous medium by the addition of an equivalent weight of cuprous chloride to form an insoluble substituted aryl mercury halide, and recovering a substantially pure substituted aryl mercury halide.

13. A commercial method of manufacturing an aromatic mercury halide which comprises diazotizing an aryl amine at a temperature of about 0–5° C. to form the diazonium salt, reacting said salt with a mercury halide to form a diazonium double salt containing mercury halide, decomposing said double salt to the presence of an equivalent amount of a soluble halide salt selected from the class consisting of NaBr, NaI, KBr and KI, at a temperature of about 5–10° C. in an acidic aqueous medium containing a water-miscible organic solvent by the addition of an equivalent weight of cuprous chloride to form an insoluble aryl mercury halide, and recovering a substantially pure aryl mercury halide.

14. A commercial method of manufacturing an aromatic mercury halide which comprises diazotizing an aryl amine at a temperature of about 0–5° C. to form the diazonium salt, reacting said salt with a mercury halide to form a diazonium double salt containing mercury halide, decomposing said double salt at a temperature of about 5–10° C. in an acidic aqueous medium by the addition of an equivalent weight of cuprous chloride to form an insoluble aryl mercury halide according to the reaction:

$$RN_2Y \cdot HgY_2 + Cu_2Y_2 \rightarrow RHgY + 2CuY_2 + N_2$$

wherein R represents an aryl group and Y represents a halide, separating the insoluble aryl mercury halide from the aqueous medium and recovering a substantially pure aryl mercury halide.

15. A commercial method of manufacturing an aromatic mercury halide which comprises diazotizing an aryl amine at a temperature of about 0–5° C. to form the diazonium salt, introducing said diazonium salt into an acidic aqueous medium admixed with a water-miscible organic solvent containing a mercury halide and an equivalent amount of cuprous halide, whereby a diazonium double salt with mercury halide is formed which is immediately decomposed by said cuprous halide to an aryl mercury halide according to the reaction:

$$RN_2Y \cdot HgY_2 + Cu_2Y_2 \rightarrow RHgY + 2CuY_2 + N_2$$

wherein R represents an aryl group and Y represents a halide, separating the insoluble aryl mercury halide from the aqueous medium and recovering a substantially pure aryl mercury halide.

16. A commercial method of manufacturing an aromatic mercury halide which comprises diazotizing an aryl amine at a temperature of about 0–5° C. to form the diazonium salt, introducing said diazonium salt into an acidic aqueous medium containing mercury chloride, an equivalent amount of cuprous chloride and an equivalent amount of a soluble halide salt selected from the class consisting of NaBr, NaI, KBr and KI, whereby a diazonium salt with mercury chloride is formed which is immediately decomposed by said cuprous halide to an aryl mercury halide, said halide being selected from the group consisting of Br and I, and recovering a substantially pure aryl mercury halide.

OTTO DANĚK.
JAROSLAV NOSEK.

REFERENCES CITED

The following references are of record in the file of this patent:

Nesmejanow et al., Ber., vol. 67, pages 130–134 (1934).

Nesmejanow, Ber., vol. 62, pages 1010–1018 (1929).

Nesmejanow et al., Ber., vol. 68, pages 1877–1883 (1935).

Nesmejanow et al., Chem. Centralblatt, 1935 II, page 389.